（12）United States Patent
Park et al.

(10) Patent No.: US 12,366,865 B2
(45) Date of Patent: Jul. 22, 2025

(54) ROBOT AND METHOD FOR CONTROLLING SAME

(71) Applicant: SAMSUNG ELECTRONICS CO., LTD., Suwon-si (KR)

(72) Inventors: Dongwoo Park, Suwon-si (KR); Hyunjoong Lee, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 346 days.

(21) Appl. No.: 17/569,890

(22) Filed: Jan. 6, 2022

(65) Prior Publication Data

US 2022/0129013 A1    Apr. 28, 2022

Related U.S. Application Data

(63) Continuation of application No. PCT/KR2020/004979, filed on Apr. 13, 2020.

(30) Foreign Application Priority Data

Aug. 29, 2019    (KR) .................... 10-2019-0106884

(51) Int. Cl.
    *G05D 1/00*    (2024.01)
(52) U.S. Cl.
    CPC ......... *G05D 1/0891* (2013.01); *G05D 1/0214* (2013.01); *G05D 1/0223* (2013.01); *G05D 1/10* (2013.01)
(58) Field of Classification Search
    None
    See application file for complete search history.

(56) References Cited

U.S. PATENT DOCUMENTS

| 8,688,273 | B2 | 4/2014 | Lee et al. |
| 8,818,555 | B2 | 8/2014 | Kim et al. |
| 9,463,571 | B2 | 10/2016 | Sinyavskiy et al. |
| 9,474,427 | B2 | 10/2016 | Lee et al. |
| 11,076,737 | B2 | 8/2021 | He et al. |
| 2008/0065265 | A1 | 3/2008 | Ozick et al. |
| 2013/0006446 | A1 | 1/2013 | Kim et al. |
| 2017/0017237 | A1* | 1/2017 | Tokuyama ........... G05D 1/0246 |

(Continued)

FOREIGN PATENT DOCUMENTS

| JP | 5255366 B2 | 8/2013 |
| JP | 2017-52299 A | 3/2017 |

(Continued)

OTHER PUBLICATIONS

Machine translation of KR20070104990A (Year: 2024).*

(Continued)

*Primary Examiner* — Navid Z. Mehdizadeh
*Assistant Examiner* — Sarah A. Mueller
(74) *Attorney, Agent, or Firm* — Sughrue Mion, PLLC (57) ABSTRACT

A method for controlling a robot includes: controlling a driving apparatus to move the robot to a preset route; detecting an obstacle on the preset route; determining an entrance angle and an entrance velocity with which a rollover index of the robot is maintained within a preset range during climbing the obstacle; and controlling the driving apparatus to climb the obstacle with the determined entrance angle and the determined entrance velocity.

7 Claims, 8 Drawing Sheets

(56) References Cited

U.S. PATENT DOCUMENTS

| | | | |
|---|---|---|---|
| 2018/0348782 A1* | 12/2018 | Sarkar | G01C 21/3492 |
| 2019/0235516 A1 | 8/2019 | Zhang et al. | |
| 2021/0009142 A1* | 1/2021 | Skillsäter | B60W 50/14 |
| 2022/0175210 A1* | 6/2022 | Choi | A47L 9/2852 |

FOREIGN PATENT DOCUMENTS

| | | | | |
|---|---|---|---|---|
| KR | 10-0640175 B1 | | 11/2006 | |
| KR | 10-2007-0079798 A | | 8/2007 | |
| KR | 20070104990 A | * | 10/2007 | B60W 30/04 |
| KR | 10-2013-0001841 A | | 1/2013 | |
| KR | 10-2018-0086001 A | | 7/2018 | |
| KR | 20180086001 A | * | 7/2018 | B60G 17/0157 |
| KR | 10-1941218 B1 | | 4/2019 | |
| KR | 10-2019-0083846 A | | 7/2019 | |
| KR | 10-2019-0095883 A | | 8/2019 | |
| KR | 10-2019-0123366 A | | 11/2019 | |
| KR | 10-2210360 B1 | | 1/2021 | |

OTHER PUBLICATIONS

Machine translation of KR20180086001A (Year: 2024).*
Machine translation of KR20070104990A (Year: 2007).*
Machine translation of KR20180086001A (Year: 2018).*
Spenko, Matthew, et al., "Hazard avoidance for high-speed mobile robots in rough terrain", May 2006, The International Society for Optical Engineering (Year: 2006).*
Shiller, Z et al., "Dynamic motion planning of autonomous vehicles", Apr. 30, 1991, IEE, pp. 241-249 (Year: 1991).*
International Search Report dated Jul. 10, 2020, issued by the International Searching Authority in counterpart International Application No. PCT/KR2020/004979 (PCT/ISA/210).
Written Opinion dated Jul. 10, 2020, issued by the International Searching Authority in counterpart International Application No. PCT/KR2020/004979 (PCT/ISA/237).
Communication issued May 23, 2023 by the Korean Intellectual Property Office in the Korean Patent Application No. 10-2019-0106884.

* cited by examiner

ROBOT AND METHOD FOR CONTROLLING SAME

CROSS-REFERENCE TO RELATED APPLICATION(S)

This application is a Continuation Application of International Application No. PCT/KR2020/004979, filed on Apr. 13, 2020 which is based on and claims priority to Korean Patent Application 10-2019-0106884, filed on Aug. 29, 2019, in the Korean Intellectual Property Office, the disclosures of which are incorporated by reference herein in their entireties.

BACKGROUND

1. Field

This disclosure relates to a robot and a method for controlling thereof and, more particularly, to a robot for bypassing or climbing an obstacle in a state where an object is loaded, and a method for controlling thereof.

2. Description of Related Art

The development of electronic technology leads to development of various robots. A robot is utilized in various industrial fields, medical fields, aerospace applications, as well as in general homes. In addition to a robot performing a function in a fixed state at a specific place, a mobile robot that moves and performs a function by itself is becoming increasingly popular.

A situation in which a robot moves while loading an object often occurs, and motion characteristics of the robot are changed according to the type and loading state of the object, thereby generating a risk of rollover of the robot. In particular, a rollover risk is generated as the center of gravity of the robot moves in a process of bypassing an obstacle or climbing an obstacle while loading an object.

Accordingly, it is necessary to set a route of the robot so that the robot is not rolled over in consideration of the center of gravity of the robot loaded with the object.

SUMMARY

Embodiments may provide a robot for determining a driving route for bypassing an obstacle or climbing an obstacle in consideration of the center of gravity of a robot loaded with an object, and a method for controlling thereof.

According to an aspect of the disclosure, there is provided a method for controlling a robot including: controlling a driving apparatus to move the robot to a preset route; detecting an obstacle on the preset route; determining an entrance angle and an entrance velocity with which a rollover index of the robot is maintained within a preset range during climbing the obstacle; and controlling the driving apparatus to climb the obstacle with the determined entrance angle and the determined entrance velocity.

The determining the entrance angle and the entrance velocity further includes: obtaining a rollover index for each of a plurality of combinations of a plurality of entrance velocities and a plurality of entrance angles for the obstacle based on a driving performance of the robot; and determining the entrance angle and the entrance velocity to be used in climbing the obstacle based on the obtained rollover index.

The determining the entrance angle and the entrance velocity further includes: based on combinations of entrance angles and entrance velocities that are capable of maintaining the preset range, among the plurality of combinations used to obtain the rollover index, selecting an entrance angle and an entrance velocity that correspond to at least one of a higher velocity or a larger entrance angle among the plurality of combinations.

The obtaining the rollover index further includes: obtaining information about a stepped portion of the obstacle; obtaining an angular impulse moment of the robot based on one entrance velocity among the plurality of entrance velocities, one entrance angle selected from the plurality of entrance angles, the obtained information about the stepped portion, and an inertial moment of the robot; obtaining a roll angle and a roll angular velocity of the robot using the obtained angular impulse moment; and obtaining the rollover index based on the roll angle and the roll angular velocity of the robot.

The obtaining the angular impulse moment further includes: calculating a climbing time corresponding to the selected entrance angle and the selected entrance velocity; and obtaining the angular impulse moment of the robot based on the calculated climbing time, the obtained information about the stepped portion, and the inertial moment.

The obtaining the rollover index further includes obtaining the roll angle of the robot based on a center of gravity of the robot.

According to an aspect of the disclosure, there is provided robot including: a sensor; a driving apparatus; and a processor configured to: control the driving apparatus to move the robot to a preset route, determine an entrance angle and an entrance velocity with which a rollover index of the robot is maintained within a preset range during climbing an obstacle based on the obstacle present in the preset route being detected, and control the driving apparatus to climb the obstacle with the determined entrance angle and the determined entrance velocity.

The processor is further configured to: obtain a rollover index for each of a plurality of combinations of a plurality of entrance velocities and a plurality of entrance angles for the obstacle based on a driving performance of the robot, and determine the entrance angle and the entrance velocity to be used in climbing the obstacle based on the obtained rollover index.

The processor is further configured to, based on combinations of entrance angles and entrance velocities that are capable of maintaining the preset range, among the plurality of combinations used to obtain the rollover index, select an entrance angle and an entrance velocity that correspond to at least one of a higher velocity or a larger entrance angle among the plurality of combinations.

The processor is further configured to: obtain information about a stepped portion of the obstacle, obtain an angular impulse moment of the robot based on one entrance velocity among the plurality of entrance velocities, one entrance angle selected from the plurality of entrance angles, the obtained information about the stepped portion, and an inertial moment of the robot, obtain a roll angle and a roll angular velocity of the robot using the obtained angular impulse moment, and obtain the rollover index based on the roll angle and the roll angular velocity of the robot.

The processor is further configured to: calculate a climbing time corresponding to the selected entrance angle and the selected entrance velocity, and obtain the angular impulse moment of the robot based on the calculated climbing time, the obtained information about the stepped portion, and the inertial moment.

The processor is further configured to obtain the roll angle of the robot based on a center of gravity of the robot.

The processor is further configured to: identify whether the robot is capable of climbing the detected obstacle, and based on the robot capable of climbing the detected obstacle, determine the entrance angle and the entrance velocity.

The processor is further configured to: based on the robot not capable of climbing the detected obstacle, set a plurality of candidate routes that bypass the obstacle, calculate transverse acceleration of the robot for each of the plurality of candidate routes, and determine one of the plurality of candidate routes as a driving route of the robot based on the calculated transverse acceleration.

The processor is further configured to calculate transverse acceleration based on a rotation radius of each of the plurality of candidate routes and moving velocity of the robot.

DETAILED DESCRIPTION

Certain embodiments are illustrated in the drawings and described in detail in the detailed description. However, the described herein is not limiting modifications, equivalents, and/or alternatives exist. In the context of the description of the drawings, like reference numerals may be used for similar components.

As used herein, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used herein may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

The expression "configured to" may be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

The robot according to an embodiment refers to an electronic device for automatically performing various functions or tasks and may include an industrial robot, a home robot, a military robot, and the like.

Hereinbelow, certain embodiments will be described in greater detail.

Figure 1:
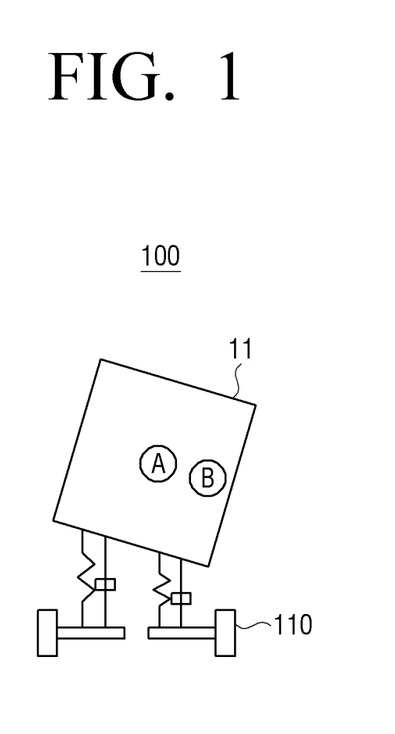
FIG. 1 is a diagram illustrating a robot according to an embodiment.

FIG. 1 is a diagram illustrating a robot according to an embodiment. FIG. 1 is a side view briefly illustrating a side of the robot 100.

The robot 100 according to an embodiment may be a mobile robot. Specifically, the robot 100 according to an embodiment may be implemented with various robots, such as a robot for performing work such as cleaning, air purification, and guard while driving a space in a building, a home service robot for performing a home service while driving a space in the house, a military robot for entering a dangerous area that cannot be accessed by a person to perform work, and the like. However, the robot 100 according to an embodiment is not necessarily limited to this, and the robot 100 may be implemented as a robot according to various embodiments.

The robot 100 may move without loading an article, or may move while loading an article or boarding a person. In this example, the center of gravity of the robot 100 is moved according to the weight of the article and the loaded state of the article.

When an article is not loaded on the robot 100, the center of gravity of the robot 100 may be located at the center A of the robot 100 without a main body 11 being tilted toward any one side. However, when an object is loaded on the robot 100, the center of gravity B of the robot 100 may deviate from the center A of the robot 100 according to the weight or loading state of the article, and the main body 11 of the robot 100 may be tilted in one direction according to the center of gravity B.

The robot 100 may face an obstacle existing on the route in the course of driving the route. In this example, the robot may bypass the obstacle or climb the obstacle. In an embodiment, the climbing means that the robot 100 climbs and goes beyond the obstacle on the route. Specifically, the climbing means that a vertical direction of the center of at least one of the plurality of wheels included in the driving apparatus 110 of the robot corresponds to the vertical direction of the obstacle surface.

As shown in FIG. 1, when the robot 100 is loaded with an article and the robot 100 rotates or climbs in a state in which the main body 10 of the robot 100 is tilted in one direction, the robot 100 is likely to roll over while the center of gravity of the robot 100 moves according to the direction of rotation or the climbing direction. To prevent this, the robot 100 may simulate a route of the robot in consideration of the center of gravity of the robot, and determine a driving route of the robot according to the simulation result.

When the robot 100 bypasses an obstacle, the robot 100 may set a plurality of routes for bypassing an obstacle, calculates transverse acceleration in each route based on the movement of the center of gravity of the robot 100, and selects a route in which a rollover index of the robot 100 is within a predetermined range.

When the robot 100 climbs an obstacle, the robot 100 may set a plurality of entrance velocities (speeds) and entrance angles to climb an obstacle, and may combine each of the entrance velocity and the entrance angle to calculate the angular impulse moment in each case. The robot 100 may calculate the angular impulse moment of the robot on the basis of the movement of the center of gravity according to the entrance velocity and the entrance angle. The robot 100 may obtain a rollover index of the robot 100 by using the calculated angular impulse moment, and may select the entrance velocity and the entrance angle which are within a predetermined range.

Hereinbelow, with reference to FIGS. 2 to 4, the robot 100 according to an embodiment will be described in greater detail.

Figure 2:
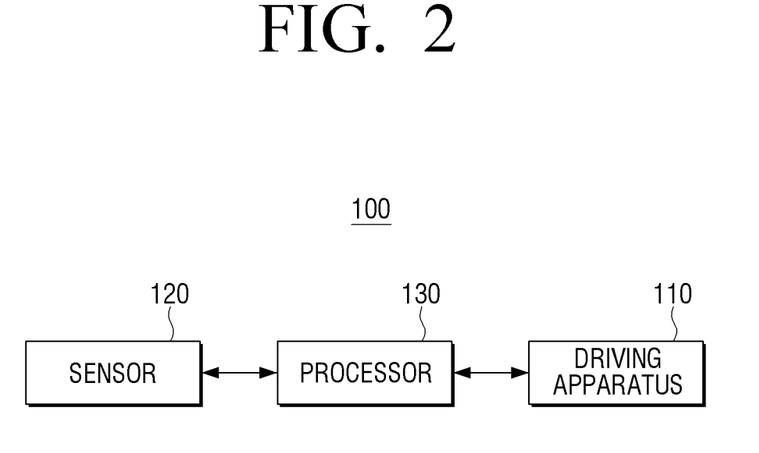
FIG. 2 is a block diagram illustrating a configuration of a robot according to an embodiment.

FIG. 2 is a block diagram illustrating a configuration of a robot according to according to an embodiment.

As illustrated in FIG. 2, the robot 100 includes the driving apparatus 110, the sensor 120, and the processor 130.

The driving apparatus 110 may move the robot 100. The driving apparatus 110 may be connected to one or more wheels and have a driving unit such as a motor capable of rotating wheels. The driving apparatus 110 may perform driving operation such as movement, stop, and directional change of the robot 100 according to the control signal of the processor 130.

The sensor 120 is configured to detect weight distribution of the robot 100 or sense an obstacle located around the robot 100.

The sensor 120 may sense position, width, height, and distance to an obstacle. The sensor 120 may include an ultrasonic sensor, an infrared sensor, a radio frequency (RF) sensor, a light detection and ranging (LiDAR) sensor, and the like, and the sensor 120 may further include a collision sensor that detects an obstacle through collision with an obstacle. The sensor 120 may further include an image sensor such as a Time of Flight (ToF) sensor, and the robot 100 may obtain an image of an obstacle using an image sensor, and obtain information such as the position, width, height, and distance to the obstacle through the obtained image.

The sensor 120 may include a load sensor for sensing the weight distribution of the robot 100. The sensor 120 may include a camera sensor for measuring the inclination of the ground line, the bottom line, and the like, and an inertial measurement unit (IMU) for sensing the direction of force applied to the body of the robot 100, the direction of acceleration, and the like.

The processor 130 may control the overall operation and function of the robot 100. For example, the processor 130 may drive an operating system or application program to control hardware or software components coupled to the processor 130, and perform various data processing and operations. The processor 130 may load instructions or data received from at least one of the other components into the volatile memory and store the various data in the non-volatile memory.

The processor 130 may include at least one of a CPU, an application processor (AP), or a communication processor (CP). The processor 130 may be implemented as at least one general processor, a digital signal processor, an application specific integrated circuit (ASIC), a system on chip (SoC), a microcomputer (MICOM), or the like.

The processor 130 may control the driving apparatus 110 to move the robot to a predetermined route. The processor 130 may detect an obstacle existing on a predetermined route. The processor 130 may detect an obstacle existing on the route using the sensor 120, and obtain information about obstacles such as the height, width, position, distance between the obstacle and the robot 100, or the like.

The processor 130 may obtain information about an obstacle based on information on a route previously stored in a memory. The information regarding the route of the robot 100 may be previously stored in the memory, and information on the route may include information about an obstacle (such as a stepped portion like steps, bump, and a static obstacle such as a manhole, etc.) existing on the route.

The processor 130 may determine whether the robot 100 may climb the obstacle based on information on obstacles existing on the driving route of the robot 100. As described above in FIG. 1, climbing indicates that at least one wheel included in the driving apparatus 110 of the robot 100 climbs on the obstacle, and refers to a state in which the vertical direction of the surface of the obstacle matches the vertical direction of the center of the wheel of the robot 100 or the vertical direction of the center of the wheel of the robot 100 is in contact with the surface of the obstacle. That is, the processor 130 may determine whether the robot 100 may climb the obstacle without rollover.

The processor 130 may determine whether the obstacle may be climbed by using height information of the obstacle using various methods.

The processor 130 may determine whether the robot 100 may climb the obstacle on the basis of pre-stored information about the driving apparatus 110 of the robot. The processor 130 may determine whether the robot 100 may climb the obstacle based on information about the radius of wheels included in the driving apparatus 110 of the robot 100. For example, when the radius of the wheel is higher than the height of the obstacle, the processor 130 may determine that the robot 100 is able to climb the obstacle, and if the height of the obstacle is higher than the radius of the obstacle, the processor 130 may determine that the robot 100 cannot climb the obstacle.

The processor 130 may determine whether the robot 100 may climb the obstacle on the basis of the dynamic energy when the robot 100 climbs the obstacle. The processor 130 may determine that the robot 100 cannot climb the obstacle when the velocity of the robot 100 is too slow. The processor 130 may determine that the robot 100 may not pass the obstacle if motion energy ($\frac{1}{2}mv^2 + \frac{1}{2}Iw^2$) (m: total weight of the robot loaded with the obstacle, v: velocity of the robot, I: inertial moment of the robot, w: angular velocity of the robot) when the robot 100 climbs the obstacle is less than $mgh_{obstacle}$ ($h_{obstacle}$ refers to the height of the obstacle or stepped portion).

The processor 130 may obtain a minimum velocity for passing the obstacle in consideration of dynamic energy and momentum. Specifically, the processor 130 may calculate a minimum velocity for the robot 100 to pass the obstacle by using the following equation, and may determine that the obstacle cannot be passed when the obstacle climbing velocity of the robot 100 is less than or equal to the minimum velocity.

$$v = \frac{7r}{(7r - 5h_{obstacle})}\sqrt{\frac{10gh_{obstacle}}{7}}$$

(v: minimum velocity of robot, r: radius of robot wheels, g: acceleration of gravity, $h_{obstacle}$: height or stepped portion of obstacle).

When the robot 100 is determined to climb the obstacle, the processor 130 may identify a weight distribution state of the robot 100 using the sensor 120, and may control the driving apparatus 110 by determining an entry direction of the robot 100 based on the same. If it is determined that the robot 100 is deflected (or biased) in the right direction, the processor 130 may control the driving apparatus 110 so that the right wheel of the robot 100 enters the obstacle first. If it is determined that the robot 100 is deflected in the left direction, the processor 130 may control the driving apparatus 110 so that the left wheel of the robot 100 enters the obstacle first. If it is determined that the weight of the robot 100 is not deflected to the left or right and located at the center, the processor 130 may control the driving apparatus 110 so that both wheels of the robot 100 enter the obstacle at the same time.

When the robot 100 enters the obstacle, the processor 130 may determine an entrance angle and an entrance velocity for the obstacle of the robot. The processor 130 may determine the entrance angle and the entrance velocity, regarding which the rollover index of the robot during the obstacle climbing process may be maintained within a predetermined range. The rollover index is a value calculated by using the vertical load distribution of both wheels of the robot 100, and is a value that numerically represents the total rollover risk of the robot 100. The rollover index may be calculated using the following equation:

$$\text{Rollover Index} = \frac{F_{zR} - F_{zL}}{F_{zL} + F_{zR}}$$

Referring to the equation described above, the processor 130 may, when the rollover index is 1, predict that the load of the robot 100 may be leaned on the right, making the robot 100 roll over in the right direction, and if the rollover index is −1, the load of the robot 100 may be leaned on the left, making the robot 100 roll over in the left direction. The processor 130 may determine that, if the calculated rollover index is 0, the load of the robot 100 is evenly distributed to the left and right, and the robot 100 is in a stable state. The processor 130 may determine that the robot 100 is in a stable state when the calculated value of the calculated rollover index is within a predetermined range from 0. At this time, the predetermined range is a value calculated by experiment, and may differ depending on the size, weight, and type of the robot. However, this is merely an example, and a predetermined range may be a value set by a user.

The processor 130 may set a plurality of entry velocity and entrance angle of the robot based on the driving performance of the robot 100, and determine an entrance velocity and an entrance angle for the robot 100 to pass the obstacle without rollover by determining the rollover index of the robot at each entrance velocity and the entrance angle. This will be described in detail with reference to FIG. 3.

If it is determined that the robot 100 may not climb the obstacle, the processor 130 may determine a driving route of the robot that bypasses the obstacle. When it is determined that the robot 100 may not pass over the obstacle, the processor 130 may set a plurality of candidate routes for bypassing the obstacle, and determine one of the plurality of candidate routes as a driving route of the robot based on the transverse acceleration applied to the robot in each route. This will be described in detail with reference to FIG. 4.

Figure 3:
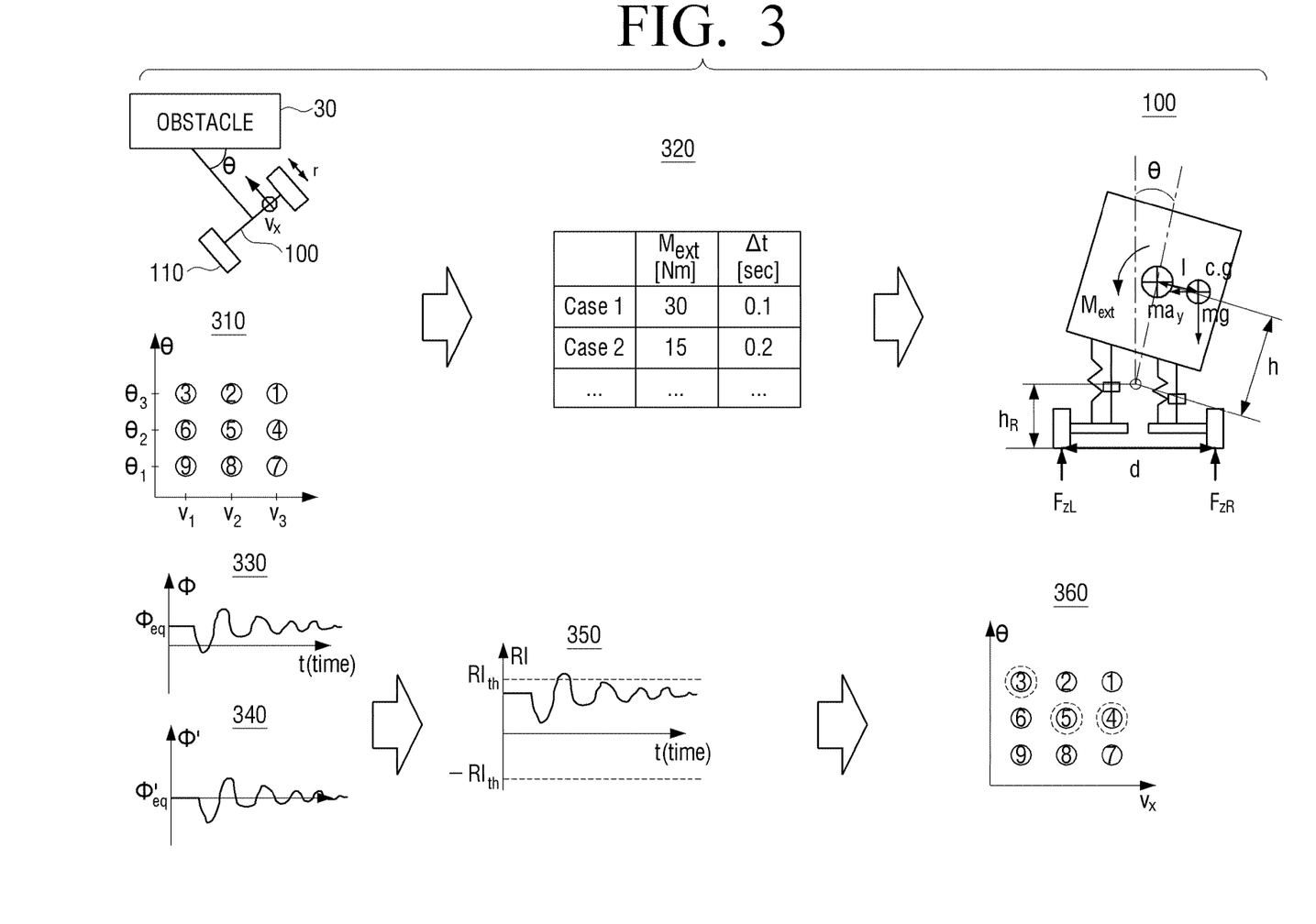
FIG. 3 is a diagram illustrating a robot climbing an obstacle according to an embodiment.

FIG. 3 is a diagram illustrating a robot climbing an obstacle according to according to an embodiment.

The processor 130 may determine the entrance angle and entrance velocity of the obstacle for the robot 100 to pass the obstacle. The processor 130 may determine the entrance angle and the entrance velocity for the obstacle such that the rollover index of the robot 100 is maintained within a predetermined range while the robot 100 is passing the obstacle.

The processor 130 may simulate a plurality of entrance velocities and whether the robot 100 is able to climb the obstacle 30 using a plurality of entrance velocities, and may determine the entrance angle and the entrance velocity to be used in the climbing process of the obstacle 30 based on the simulation.

As shown by reference numerals 310 and 320, the processor 130 may set a plurality of entrance velocities ($V_1$, $V_2$, $V_3$), and entrance angles ($\theta_1$, $\theta_2$, $\theta_3$) with which the robot may enter an obstacle 30 based on the driving performance of the robot 100. The processor 130 may combine the entrance velocity ($V_1$, $V_2$, $V_3$) and the entrance angles ($\theta_1$, $\theta_2$, $\theta_3$) with respect to the obstacle, respectively, to obtain the rollover index of the robot 100 for each combination, e.g., case 1, case 2, etc.

More specifically, the processor 130 may calculate a climbing time corresponding to the selected entrance velocity and the entrance angle by using one selected velocity among a plurality of entrance velocities ($V_1$, $V_2$, $V_3$), and one entrance angle selected among a plurality of entrance angles ($\theta_1$, $\theta_2$, $\theta_3$). Here, the climbing time $\Delta t$ denotes the time taken for the center of the wheel of the robot 100 to coincide with the vertical direction of the obstacle surface for the first time. The climbing time $\Delta t$ may be calculated using the following equation:

$$\Delta t \text{ (climbing time)} = \frac{r\cos\theta}{v_x \sin\theta} = \frac{r}{v_x \tan\theta}$$

($V_x$: entrance velocity of the robot, $\theta_x$: entrance angle)

The processor 130 may obtain the robot's angular impulse moment ($M_{ext}$) based on the calculated climbing time, step information (or obstacle height information), or the moment of inertia of the robot 100. The step information is information about the step between the obstacle and the ground where the robot is placed, which means height information for the robot 100 to climb the obstacle.

The processor 130 may calculate the climbing angular velocity variables ($\Delta w$) and the angular impulse amount ($\Delta L$) of the robot 100 based on the calculated climbing time, and the angular impulse moment ($M_{ext}$) may be obtained based on the calculated climbing angular velocity variables ($\Delta W$) and the angular impulse moment ($\Delta L$). The equation is as follows:

$$\Delta W(\text{충돌각속도변화량}) = \frac{h_{obstacle}}{\Delta t\left(\frac{d}{2}\right)}$$

$$\Delta W = \frac{h_{obstacle}}{\Delta t\left(\frac{d}{2}\right)}$$

(ΔW: change in angular velocity during climbing obstacle, Δt: climbing time, $h_{obstacle}$: height of the step, d: distance between two wheels of the robot)

$$\Delta L(\text{각충격량}) = I_x \Delta W = M_{ext} \Delta t$$

$$\Delta_t \times I_x \Delta W = M_{ext} \Delta t$$

(ΔL: Angular Impulse, $I_x$: inertial moment of robot, $M_{ext}$: angular impulse moment of robot)

$$\Delta M_{ext} = \frac{I_x h_{obstacle}}{\Delta t^2 \left(\frac{d}{2}\right)} = \frac{2v_x^2 (\tan\theta)^2 I_x h_{obstacle}}{dr^2}$$

The processor 130 may match the climbing time (Δt) and the angular impulse moment ($M_{ext}$) for each entrance velocity ($V_x$) and entrance angle ($\theta_x$) and store the same in the memory. For example, as shown in the table 320, when the entrance velocity is $V_3$, and the entrance angle is $\theta_3$, the angular impulse moment ($M_{ext}$) 30 and climbing time (Δt) 0.1 may be matched and stored. The processor 130 may, when the entrance velocity is $V_2$ and the entrance angle is $\theta_2$, may match and store the angular impulse moment ($M_{ext}$) 15 and the climbing time (Δt) 0.2.

As shown by reference numerals 330 and 340, the processor 130 may obtain a roll angle (φ) and roll angular velocity (φ') of the robot 100 using the acquired angular impulse moment ($M_{ext}$). Specifically, the processor 130 may obtain the roll angle (φ) and the roll angular velocity (φ') by entering the obtained angular impulse moment ($M_{ext}$) to the equation of the Roll Dynamics below. Here, the roll angle φ shows the degree to which the robot 100 tilts while climbing the obstacle 30, and the roll angular velocity φ' shows the amount of change in the roll angle φ over time. The roll dynamics equation for obtaining the roll angle (φ) and roll angular velocity (φ') is as follows.

$$I_x \theta'' + C_\theta \theta' + K_\theta \theta = mg(h \sin\theta + l \cos\theta) - ma_y(h \sin\theta + l \sin\theta) + M_{ext}$$

($I_x$: inertial moment of robot, $C_\varphi$: resistance constant (or damping constant)
K: spring constant m: total weight of robot,
g: gravity acceleration,
h: distance from the roll center of robot to the center of robot (A)
l: distance between the center of robot (A) and center of gravity (B)
$a_y$: acceleration of the robot in transverse direction)

Here, l refers to the distance between the center of gravity (A) and the center of gravity (B) of the robot, so that the processor 130 may obtain the robot's roll angle and roll angular velocity using the center of gravity of the robot.

The processor 130 may calculate a force Δf applied to the wheel of the robot 100 based on the obtained roll angle (φ) and the roll angular velocity (φ'). The processor 130 may calculate a force applied to the wheels of the robot 100 using the following equation.

$$\Delta F = \frac{K_\varphi(\varphi - \varphi_{eq}) + C_\varphi(\varphi' - \varphi'_{eq})}{2d}$$

(K: spring constant C: resistance constant (or damping constant)
$\varphi_{eq}$: tilted angle of the robot just before entering the obstacle (roll angle just before entering the obstacle)
$\varphi'_{eq}$: tilted angled of the robot just before entering the obstacle (roll angular velocity just before entering the obstacle)

As shown by reference numeral 350, the processor 130 may calculate the rollover index when the robot 100 climbs the obstacle by applying the force (ΔF) of the robot 100 applied to the wheels to the equation of calculating the rollover index. The processor 130 may calculate the rollover index of the robot 100 by using the equation below.

$$\text{Rollover Index} = \frac{(F_{zR} - \Delta F) - (F_{zL} + \Delta F)}{(F_{zL} + \Delta F) + (F_{zR} - \Delta F)}$$

The processor 130 may calculate a clipping time (Δt), an angular impulse moment ($M_{ext}$) for each of the combination of a plurality of entrance velocities ($V_x$) and entrance angles ($\theta_x$), and obtain a roll angle (φ) and a roll angular velocity (φ') of the robot 100 on the basis of the calculated angular impulse moment ($M_{ext}$), and obtain a rollover index by using the obtained roll angle (φ) and the roll angular velocity (φ'). The processor 130 may obtain the rollover index as many as the number of combinations of the plurality of entrance velocities ($V_x$) and the entrance angles ($\theta_x$).

The processor 130 may determine the entrance angle and the entrance velocity to be used in the climbing of the obstacle based on the obtained rollover index.

The processor 130 may select a rollover index that is within a predetermined range (e.g., not less than $-RI_{th}$ and not more than $RI_{th}$) from among the plurality of acquired rollover indices. The processor 130 may determine the entrance velocity and the entrance angle corresponding to the selected rollover index. The entrance velocity and entrance angle corresponding to the selected rollover index represent the entrance velocity and the entrance angle used to calculate the selected rollover index.

The processor 130 may control the driving apparatus 110 so as to climb the obstacle with the determined entrance angle and the entrance velocity.

If there are a plurality of predetermined rollover indices within a predetermined range among the acquired plurality of rollover indices, that is, if a combination of an entrance angle and an entrance velocity to maintain the rollover index to a preset range, the processor 130 may select the entrance velocity and the entrance angle satisfying a preset condition. For example, the processor 130 may select the entrance angle and the entrance velocity with a high velocity or a large entrance angle among the plurality of combinations.

For example, as shown by reference numeral 360, out of combinations of nine entrance angles and entrance velocities of a graph 310 in FIG. 3, the rollover index of a case (Case 3) of entrance velocity ($V_1$) and entrance angle ($\theta_3$), case 5 of entrance velocity ($V_2$) and entrance angle ($\theta_2$) and case 4 of entrance velocity ($V_3$) and entrance angle ($\theta_2$) is within a set range. In this example, the processor 130 may first choose a case where the velocity is fast and the entrance velocity is large. The processor 130 may choose the entrance velocity and entrance angle of case 4 instead of the entrance velocity and entrance angle of case 5. The processor 130 may select an entrance velocity and an entrance angle by preferentially considering the entrance angle. For example, as in case 3 and case 4, if the one has the faster entrance velocity and the other has the faster entrance angle, the processor 130 may select case 3 instead of case 4 by preferentially considering the entrance angle. This is merely an example, and the processor 130 may select the entrance velocity and the entrance angle by preferentially considering the entrance velocity. If the processor 130 has a plurality of rollover indexes within a predetermined range, the processor 130 may select the entrance velocity and the entrance angle in a manner different from the above-described method.

The processor 130, in addition to the above-described in FIG. 2, if there is no rollover index within the set range of a plurality of rollover indexes obtained, it may be determined that the robot 100 may not climb the obstacles.

Figure 4:
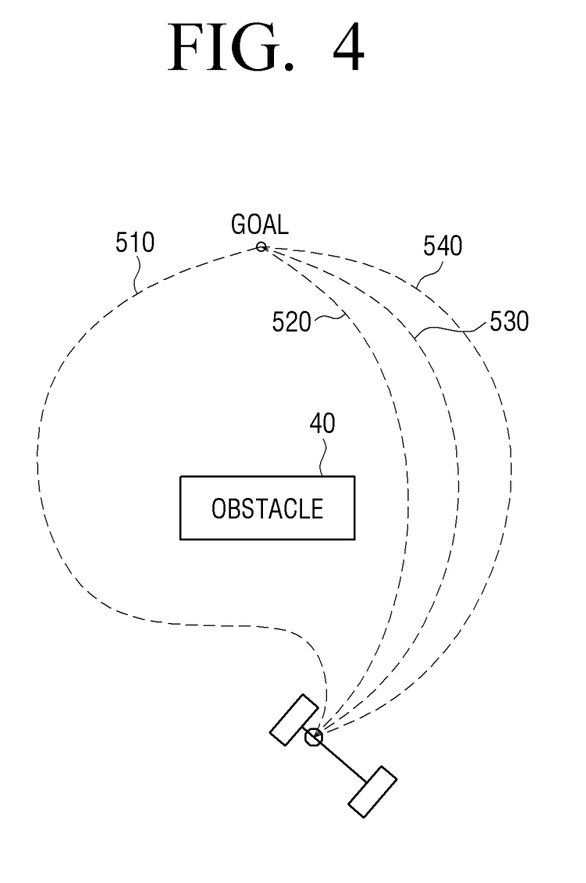
FIG. 4 is a diagram illustrating a robot bypassing an obstacle according to an embodiment.

FIG. 4 is a diagram illustrating a robot bypassing an obstacle according to according to an embodiment.

If it is determined that the climbing of the obstacle is impossible, the processor 130 may determine whether a predetermined route of the robot 100 exists. When it is determined that the predetermined route exists, the processor 130 may determine whether the predetermined route is changed to another route, and may set routes 510 to 540, as a plurality of candidate routes, to bypass the obstacle 40 of the robot 100 based on whether the lowest velocity of the robot 100 is set.

The processor 130 may set a candidate route in consideration of the center of gravity of the robot 100. For example, when the center of gravity of the robot 100 is deflected to the left side of the robot 100, the processor 130 may set the route 520, 530, and 540 driving on the right side of the obstacle as the candidate route when the left wheel of the robot 100 is rotated first. On the other hand, when the center of gravity of the robot 100 is deflected to the right side of the robot 100, the processor 130 may set the route 510 on the left side of the obstacle as a candidate route when the right wheel of the robot 100 is rotated first.

The processor 130 may calculate transverse acceleration $a_y$ of the robot for each of the plurality of candidate routes. Specifically, referring to the equation below, the processor 130 may calculate the transverse acceleration $a_y$ based on the route radius R and the driving velocity V of the robot 100. The route radius R of the robot 100 represents the radius of rotation of the robot 100 bypassing the obstacle.

$$a_y = \frac{v^2}{R}$$

The processor 130 may determine one of the plurality of candidate routes as a driving route of the robot based on the calculated transverse acceleration. The processor 130 may select, as a driving route of the robot, a candidate route in which the range of the transverse acceleration among the plurality of candidate routes is within a predetermined range.

In order to calculate the transverse acceleration range, the processor 130 may use a rollover index. Specifically, the processor 130 may obtain a force applied to the left and right wheels of the robot 100 using the following equation.

$$F_{zL} = \frac{ma_y h + mg\left(\frac{d}{2} - l\right)}{d}$$

$$F_{zR} = \frac{-ma_y h + mg\left(\frac{d}{2} + l\right)}{d}$$

($F_{ZL}$: the power applied to the left wheel, $F_{ZR}$: the power applied to the right wheel l: distance between the gravity of weight (B) and the center (A) of robot d: distance between two wheels of robot)

The processor 130 may calculate the range of transverse acceleration using an equation of calculating the rollover index of the robot 100. The processor 130 may set the range of the rollover index to a set range (e.g., $-RI_{th}$ or more and $RI_{th}$ or less) in order to enable that the robot 100 safely bypasses obstacles without rollover, and may set the range of transverse acceleration.

$$RolloverIndex = \frac{F_{zR} - F_{zL}}{F_{zR} + F_{zL}} = \frac{-2a_y h + 2gl}{gd} - RI_{th} < \frac{-2a_y h + 2gl}{gd} < RI_{th} \rightarrow$$

$$\frac{RI_{th}gd - 2gl}{-2h} < a_y < \frac{-RI_{th}gd - 2gl}{-2h}$$

In that the range of transverse acceleration described above is calculated on the premise that the rollover index exists within the set range, the processor 130 may determine that if the transverse acceleration is within the above-described range, the robot 100 bypasses the obstacle 40 without rollover.

If the processor 130 may not change the preset route of the robot 100, or if the lowest velocity of the robot 100 is not set, the processor 130 may divide the preset route of the robot into a plurality of segments, and may adjust the driving velocity of the robot so that the transverse acceleration for the rotation radius at each divided segment may be adjusted to the preset range.

If the route of the robot 100 is set and may not be changed, the processor 130 may divide the preset route into a plurality of segments, and may determine the driving velocity of the robot so that the transverse acceleration becomes the value within the described range based on the rotation radius at each divided segment.

If the lowest velocity of the robot 100 is not set, the processor 130 may divide the shortest route to the destination into a plurality of segments, and determine the driving velocity of the robot to allow the transverse acceleration to be a value in the range described above based on the radius of rotation in each divided segment. However, this is merely exemplary, and if the lowest velocity is not set, the driving velocity and route of the robot may be determined by various methods.

Figure 5:
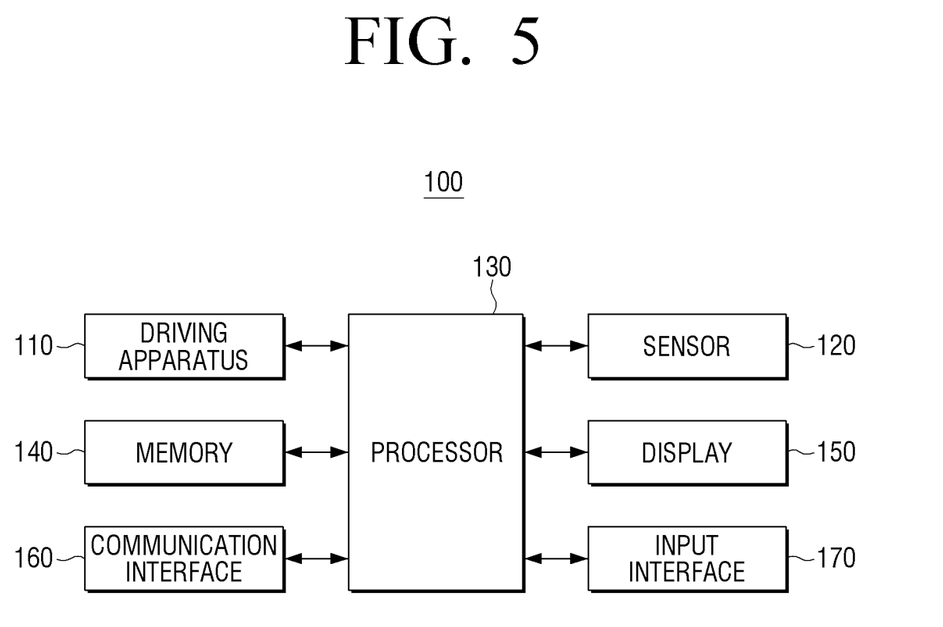
FIG. 5 is a block diagram illustrating a robot in detail according to an embodiment.

FIG. 5 is a block diagram illustrating a robot in detail according to according to an embodiment.

Referring to FIG. 5, the robot 100 may include driving apparatus 110, the sensor 120, the processor 130, the memory 140, the display 150, the communication interface 160, and the input interface 170. Hereinafter, the duplicated description of the above-described content will be omitted or abbreviated.

The memory 140 may store programs or data required for an operation of the robot 100. The memory 140 may be implemented as a non-volatile memory, a volatile memory, a flash memory, a hard disk drive (HDD), a solid-state drive (SSD), or the like. The memory 140 is accessed by the processor 130 and reading/writing/modifying/deleting/updating of data by the processor 130 may be performed. In an embodiment, the term memory may include the memory 140, read-only memory (ROM) in the processor 130, RAM, or a memory card (for example, a micro secure digital (SD) card, and a memory stick) mounted to the robot 100. In addition, the memory 140 may store programs and data for controlling various screens to be displayed in the display area of the display of the robot 100.

In addition, the memory 140 may store an artificial intelligence (AI) agent for operating the dialogue system. Specifically, the robot 100 may use an AI agent to generate a natural language in response to user's utterance. At this time, the AI agent is a dedicated program for providing an AI-based service (e.g., a speech recognition service, a secretary service, a translation service, a search service, etc.). In particular, the AI agent may be executed by an existing general-purpose processor (e.g., a CPU) or a separate AI-only processor (e.g., a graphics processing unit (GPU), etc.).

The memory 140 may store map information. The map information may be information indicating the driving route that the robot 100 moved or a mobile route, and may be in an image form, or may be trajectory data in the form of coordinates.

The memory 140 may store a floor plan of an indoor space received through the communication interface 160. The floor plan may include position information and space information by spaces.

The display 150 may display a variety of screens. For example, the display 150 may display information related to various functions provided by the robot 100 and/or a user interface for interacting with the user. The display 150 may display information about the type of work currently being performed or the degree of progress of the work.

The display 150 may be implemented with various types such as a liquid crystal display (LCD), plasma display panel (PDP), light emitting diode (LED), organic light emitting diode (OLED), or the like.

The display 150 may be coupled with a touch sensor and may be implemented with a touch screen.

The communication interface 160 is a component for the robot 100 to perform communication with an external device (not in the city). Through the communication interface 160, the robot 100 may obtain information about obstacles from an external device. The robot 100 may receive user commands for performing the operation from an external device through the communication interface 160. Here, the work may be a variety of tasks, such as air purification, cleaning work, or moving goods. The external devices may be smartphones, etc., but are not necessarily limited thereto.

The communication interface 160 may include various communication modules such as a wired communication module, near-field wireless communication module, wireless communication module, or the like.

The wired communication module is a module for performing communication with an external device according to a wired communication method such as wired Ethernet. The near field communication module is a module for performing communication with an external terminal (not illustrated) positioned at a near distance through near field communication methods such as Bluetooth (BT), Bluetooth low energy (BLE), ZigBee, or the like. The wireless communication module is a module which communicates by being connected to an external network according to a wireless communication protocol, such as wireless fidelity (Wi-Fi), Institute of Electrical and Electronics Engineers (IEEE) and the like. The wireless communication module may further include a mobile communication module which is connected to a mobile communication network according to various mobile communication standards such as 3rd generation (3G), 3rd generation partnership project (3GPP), long term evolution (LTE), LTE advanced (LTE-A), 5th generation (5G) networks, or the like, to perform communications.

The input interface 170 may include a plurality of function keys for enabling a user to set or select various functions supported by the robot 100. The input interface 170 may be implemented as a device such as a plurality of buttons, and may be implemented as a touch screen capable of simultaneously performing functions of the display 150.

The input interface 170 may receive a command for controlling power of the robot 100, a command for selecting a task, a command for selecting a work area, and the like.

The robot 100 according to according to an embodiment may further include a camera for capturing a surrounding user and a microphone for receiving a user voice.

Figure 6:
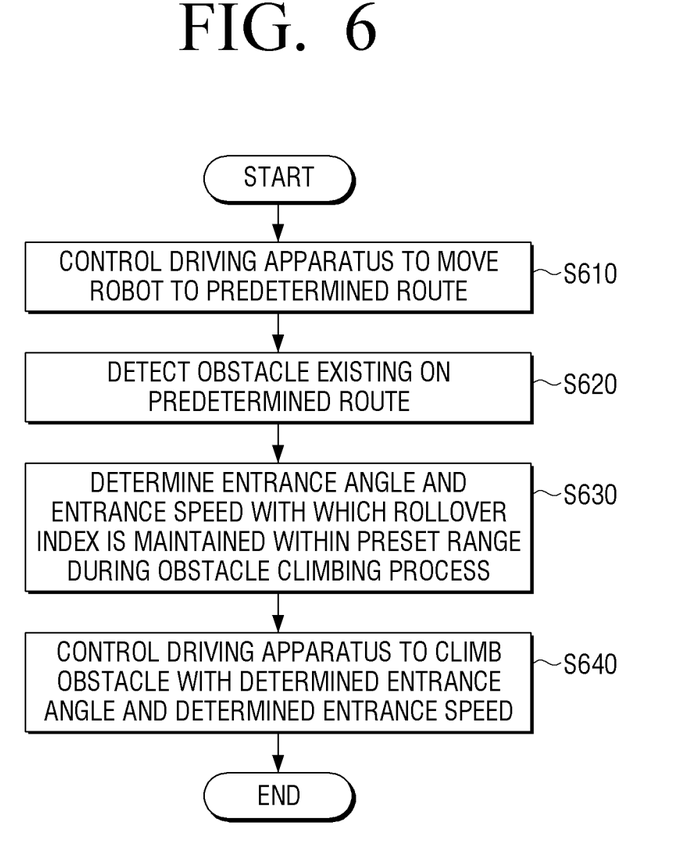
FIGS. 6, 7, and 8 are flowcharts illustrating a method for controlling a robot according to an embodiment.

FIG. 6 is a flowchart illustrating a method for controlling a robot according to according to an embodiment.

Referring to FIG. 6, the driving apparatus may be controlled to move the robot to a predetermined route in operation S610. The predetermined route may be the shortest route to the destination predetermined by the system or a route set by the user. However, the embodiment is not limited thereto and the route may be set according to various embodiments.

In operation S620, an obstacle existing on a predetermined route is detected. If an obstacle is detected, information about the obstacle such as the height, width of the robot present in the route and distance between the obstacle and the robot, or the like, may be obtained.

Based on the obtained information of the obstacle, it is possible to determine whether the robot may climb the obstacle. This will be described in greater detail with reference to FIG. 7.

If it is determined that the robot is able to climb the obstacle, the entrance angle and the entrance velocity with which the rollover index is maintained within a preset range during the obstacle climbing process may be determined in operation S630.

More specifically, based on the driving performance of the robot, a rollover index for each of a plurality of combinations having a plurality of entrance velocities and a plurality of entrance angles may be obtained, and an entrance angle and an entrance velocity to be used in the climbing process of the obstacle based on the obtained rollover index may be determined. This will be described in detail with reference to FIG. 7.

The driving apparatus may be controlled to climb the obstacle with the determined entrance angle and the determined entrance velocity in operation S640.

Figure 7:
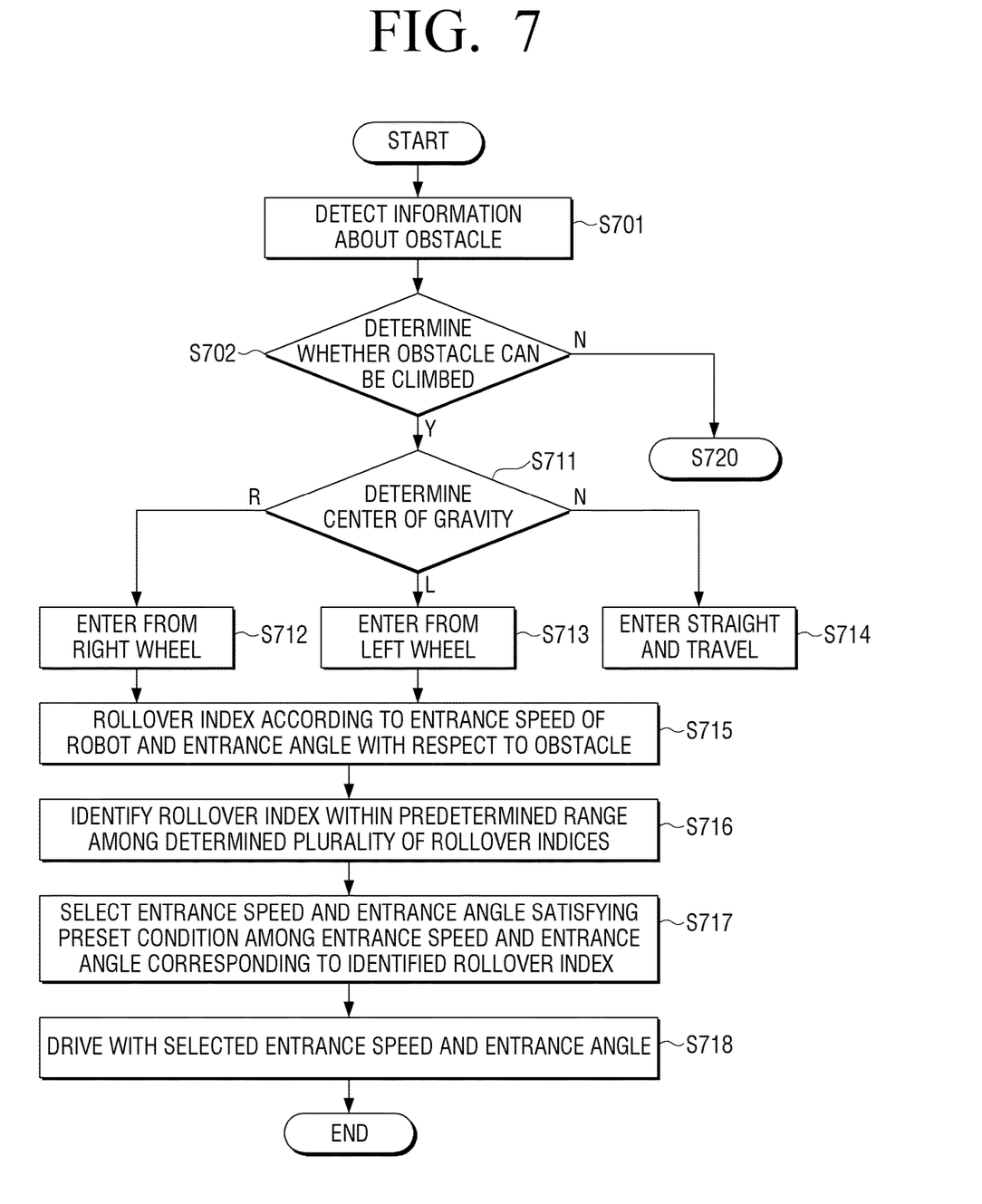
Figure 8:
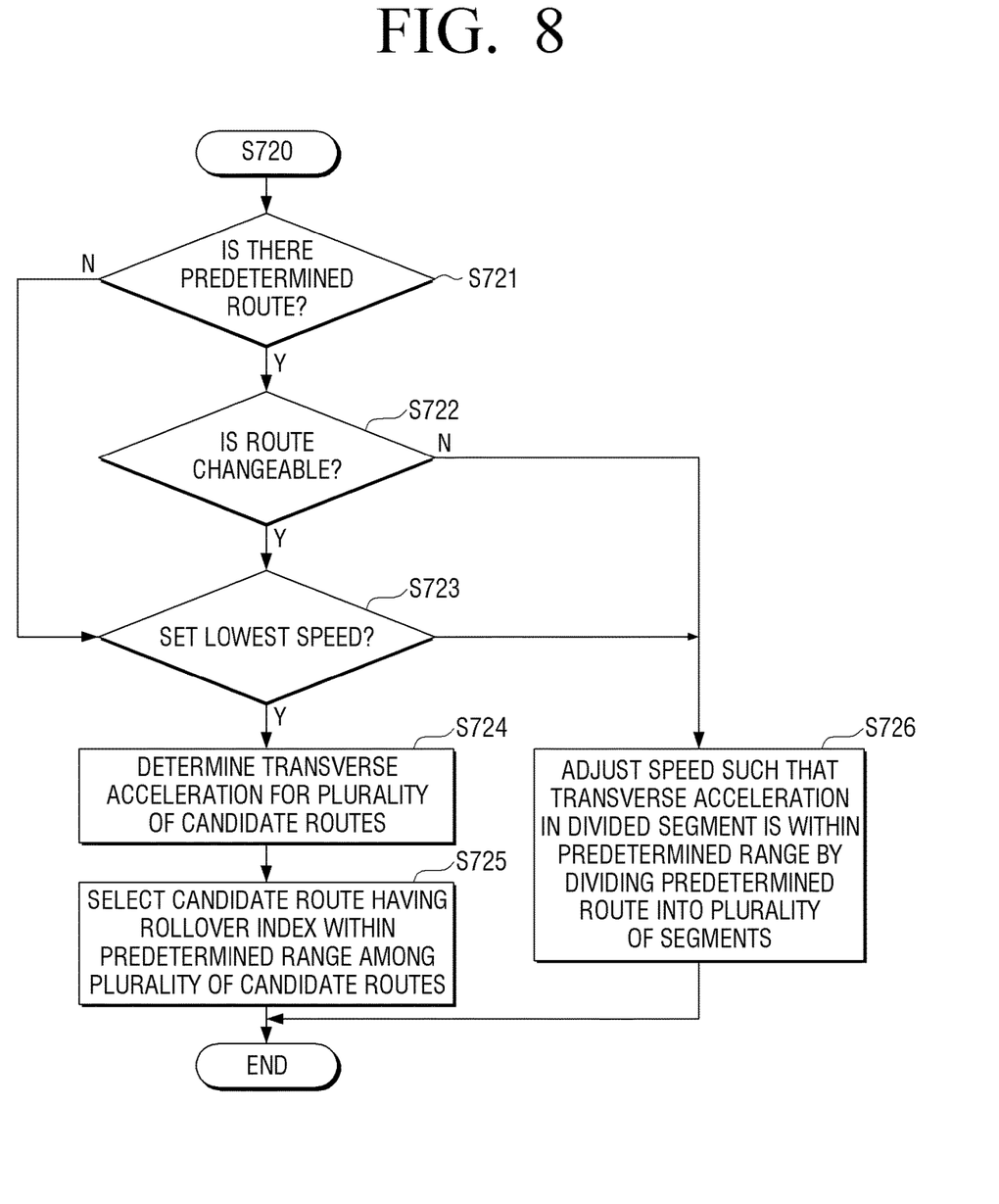

FIGS. 7 and 8 are flowcharts illustrating a method for controlling a robot according to according to an embodiment.

First, information on obstacles existing on the route of the robot may be detected in operation S701. The information on the obstacle may be detected by various sensors included in the robot, and may be included in information on a route previously stored in the memory.

On the basis of the information about the obstacle, the robot may determine whether the robot may climb an obstacle in operation S702. On the basis of the height or step height of the obstacle, whether the robot may pass the obstacle may be determined using the radius of the robot, the kinetic energy of the robot, and the momentum.

If it is determined that the robot can pass the obstacle in operation S702 (S702-Y), the center of gravity of the robot may be determined in operation S711. Specifically, it is possible to determine whether the center of gravity of the robot is biased in any direction.

When the center of gravity of the robot is deflected to the right, the robot may enter from the right wheel of the robot in operation S712 and may enter the left wheel of the robot when the center of gravity of the robot is deflected to the left in operation S713. In addition, when the center of gravity of the robot is not deflected to the right or left (i.e., neutral), the robot may enter straight and travel straight in operation S714.

However, when the center of gravity of the robot is deflected to the right or left, the rollover index according to the entrance velocity of the robot and the entrance angle with respect to the obstacle may be obtained in operation S715.

The rollover index for each of a plurality of combinations having a plurality of entrance velocities and a plurality of entrance angles for the obstacle may be obtained based on a driving performance of the robot.

An angular impulse moment of the robot may be obtained based on one entrance velocity selected from a plurality of entrance velocities, one entrance angle selected from a plurality of entrance angles, obtained information about a stepped portion and the moment of inertia of the robot. A climbing time corresponding to the selected entrance angle and the selected entrance velocity may be calculated, and the angular impulse moment of the robot based on the calculated climbing time, the obtained information about a stepped portion, and the inertial moment may be obtained.

By using the angular impulse moment obtained, the roll angle and roll angular velocity of the robot may be obtained, and the rollover index of the robot may be obtained based on the obtained roll angle and roll angular velocity. Specifically, the robot's roll angle and roll angular velocity may be obtained based on the center of gravity of the robot.

A pre-determined rollover index within a preset range among a plurality of full rollover indexes of a robot obtained by combining a plurality of entrance velocities and a plurality of entrance angles may be selected in operation S716. In this case, if there are a plurality of pre-determined rollover indexes within a predetermined range among the acquired plurality of risk indexes, that is, when a combination of an entrance angle and an entrance velocity to maintain the rollover index in a preset range is plural, an entrance velocity and an entrance angle satisfying a preset condition may be selected, in operation S717. For example, it is possible to select an entrance angle and an entrance velocity with an entrance angle with a high velocity or a large entrance angle among the plurality of combinations. The robot is the driven with the selected entrance velocity and entrance angle in operation S718.

If it is determined that a rollover index within a predetermined range does not exist, or it is determined that the robot cannot climb the obstacle in operation S702 (S702-N), an obstacle may be bypassed (Operation S720).

In this example, it is possible to determine whether a predetermined route for bypassing an obstacle exists in operation S721 (S721-Y). If a predetermined route exists, and the route may be changed in operation S722 (S722-Y), it is possible to determine whether the lowest driving velocity of the robot is set in operation S723.

When the lowest velocity of the robot is set (S723-Y), the plurality of candidate routes for bypassing the obstacle may be set, and the transverse acceleration of the plurality of candidate routes may be calculated in operation S724. The transverse acceleration may be calculated based on a rotation radius of each of the plurality of routes and moving velocity of the robot.

A candidate route having transverse acceleration within a predetermined range among the plurality of candidate routes may be selected as a driving route of the robot based on the calculated transverse acceleration in operation S725.

If the predetermined route of the robot cannot be changed or the lowest velocity of the robot is not set, the velocity may be adjusted such that the transverse acceleration in the divided segment is within a predetermined range by dividing the predetermined route into a plurality of segments in operation S726. In addition, a predetermined route may be driven at a controlled velocity.

According to various embodiments described above, computer instructions for performing processing operations of the robot 100 according to the various embodiments described above may be stored in a non-transitory computer-readable medium. The computer instructions stored in the non-transitory computer-readable medium may cause a particular device to perform processing operations on the robot 100 according to the various embodiments described above when executed by the processor of the particular device.

The non-transitory computer-readable medium does not refer to a medium that stores data for a short period of time, such as a register, cache, memory, etc., but semi-permanently stores data and is available of reading by the device. Specifically, programs of performing the above-described various methods may be stored in a non-transitory computer readable medium such as a CD, a DVD, a hard disk, a Blu-ray disk, universal serial bus (USB), a memory card, ROM, or the like, and may be provided.

While certain embodiments have been shown and described, this is not limiting, and various modifications may be made by those having ordinary skill in the relevant technical field, without departing from the gist of the disclosure as claimed by the appended claims. Also, it is intended that such modifications are not to be interpreted independently from the technical idea or prospect of the disclosure.

The invention claimed is:

1. A method for controlling a robot, the method comprising:
controlling a driving apparatus to move the robot to a preset route;
detecting an obstacle on the preset route;
determining an entrance angle and an entrance velocity with which a rollover index of the robot is maintained within a preset range during climbing the obstacle, wherein the determining the entrance angle and the entrance velocity comprises:
simulating traversal of the obstacle by the robot using a plurality of entrance velocities;
obtaining, based on a result of the simulation, the rollover index for each of a plurality of combinations of a plurality of entrance velocities and a plurality of entrance angles for the obstacle based on a driving performance of the robot; and
based on combinations of entrance angles and entrance velocities that are capable of maintaining the preset range, among the plurality of combinations used to obtain the rollover index, determining an entrance angle and an entrance velocity that correspond to at least one of a highest velocity or a largest entrance angle among the plurality of combinations to be the entrance angle and the entrance velocity to be used in climbing the obstacle; and controlling the driving apparatus to climb the obstacle with the determined entrance angle and the determined entrance velocity, wherein the obtaining the rollover index further comprises:

obtaining information about a stepped portion of the obstacle;

calculating a climbing time corresponding to one entrance angle selected from the plurality of entrance angles and one entrance velocity selected from the plurality of entrance velocities;

obtaining an angular impulse moment of the robot based on the selected entrance velocity, the selected entrance angle, the calculated climbing time, the obtained information about the stepped portion, and an inertial moment of the robot;

obtaining a roll angle and a roll angular velocity of the robot using the obtained angular impulse moment; and obtaining the rollover index based on the roll angle and the roll angular velocity of the robot.

2. The method of claim 1, wherein the obtaining the rollover index further comprises obtaining the roll angle of the robot based on a center of gravity of the robot.

3. A robot comprising:

a sensor;

a driving apparatus;

at least one memory storing one or more instructions; and at least one processor configured to execute the one or more instructions, wherein the one or more instructions, when executed by the at least one processor, cause the robot to:

control the driving apparatus to move the robot to a preset route, based on detecting an obstacle on the preset route, determine an entrance angle and an entrance velocity with which a rollover index of the robot is maintained within a preset range during climbing an obstacle by:

simulating traversal of the obstacle by the robot using a plurality of entrance velocities, obtaining, based on a result of the simulation, the rollover index for each of a plurality of combinations of a plurality of entrance velocities and a plurality of entrance angles for the obstacle based on a driving performance of the robot, and based on combinations of entrance angles and entrance velocities that are capable of maintaining the preset range, among the plurality of combinations used to obtain the rollover index, determining an entrance angle and an entrance velocity that correspond to at least one of a highest velocity or a largest entrance angle among the plurality of combinations to be the entrance angle and the entrance velocity to be used in climbing the obstacle, and control the driving apparatus to climb the obstacle with the determined entrance angle and the determined entrance velocity, and wherein the obtaining the rollover index further comprises:

obtaining information about a stepped portion of the obstacle, calculating a climbing time corresponding to one entrance angle selected from the plurality of entrance angles and one entrance velocity selected from the plurality of entrance velocities;

obtaining an angular impulse moment of the robot based on the selected entrance velocity, the selected entrance angle, the calculated climbing time, the obtained information about the stepped portion, and an inertial moment of the robot, obtaining a roll angle and a roll angular velocity of the robot using the obtained angular impulse moment, and obtaining the rollover index based on the roll angle and the roll angular velocity of the robot.

4. The robot of claim 3, wherein the one or more instructions, when executed by the at least one processor, cause the robot to obtain the roll angle of the robot based on a center of gravity of the robot.

5. The robot of claim 3, wherein the one or more instructions, when executed by the at least one processor, cause the robot to:

identify whether the robot is capable of climbing the detected obstacle, and based on the robot being capable of climbing the detected obstacle, determine the entrance angle and the entrance velocity.

6. The robot of claim 5, wherein the one or more instructions, when executed by the at least one processor, cause the robot to:

based on the robot not being capable of climbing the detected obstacle, set a plurality of candidate routes that bypass the obstacle, calculate transverse acceleration of the robot for each of the plurality of candidate routes, and determine one of the plurality of candidate routes as a driving route of the robot based on the calculated transverse acceleration.

7. The robot of claim 6, wherein the one or more instructions, when executed by the at least one processor, cause the robot to calculate transverse acceleration based on a rotation radius of each of the plurality of candidate routes and moving velocity of the robot.

* * * * *